No. 679,327. Patented July 30, 1901.
M. S. NEWCORN.
FISH TRAP.
(Application filed Apr. 5, 1901.)
(No Model.) 2 Sheets—Sheet 1.
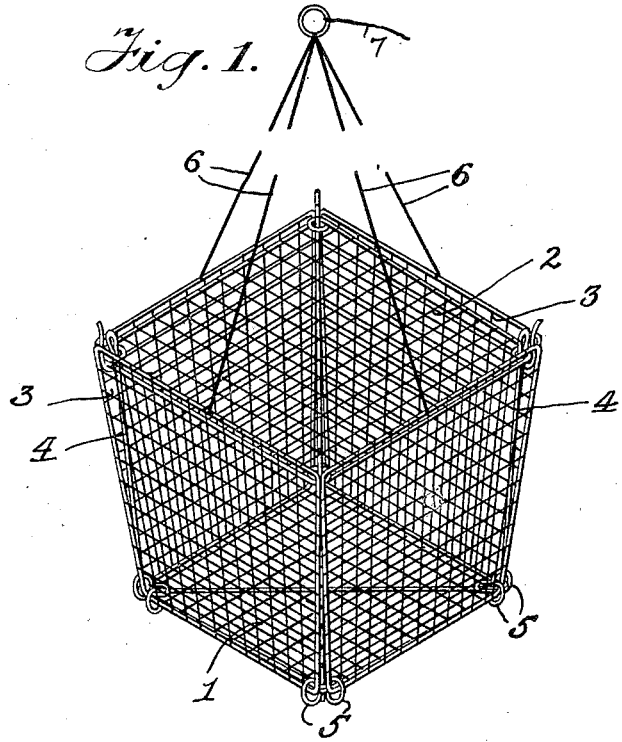
Fig. 1.
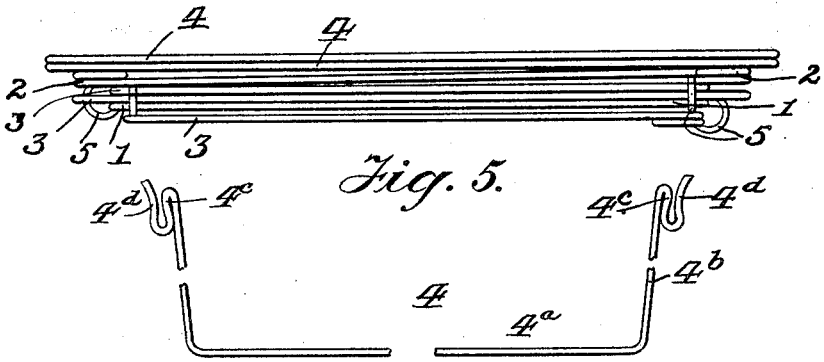
Fig. 4.
Fig. 5.
Witnesses
Charles D. Jones.
K. G. Le Ard.
Inventor
Morris S. Newcorn
By his Attorney
Geo. S. Cruse.
THE NORRIS PETERS CO., PHOTO-LITHO., WASHINGTON, D. C.

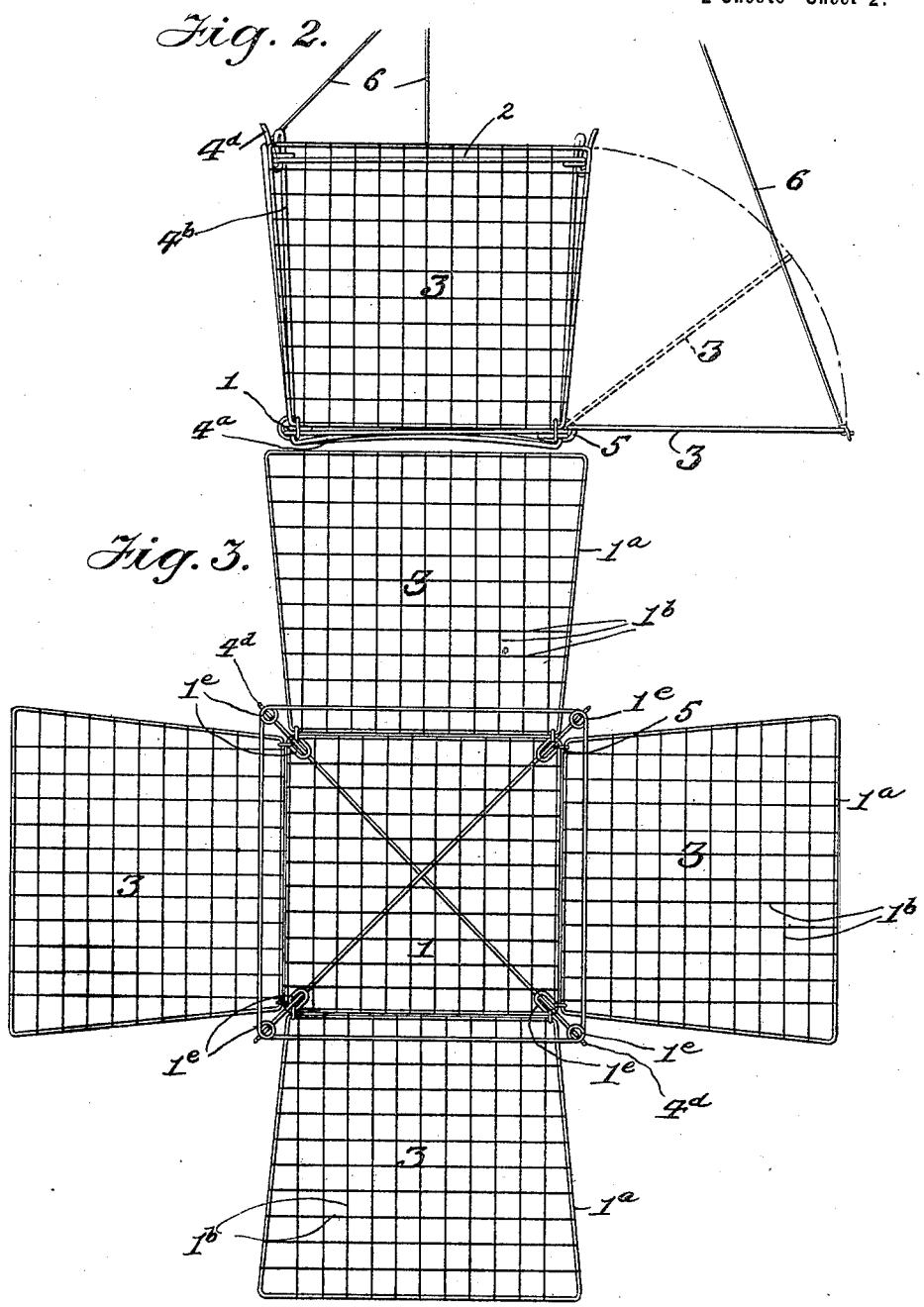

UNITED STATES PATENT OFFICE.

MORRIS S. NEWCORN, OF NEW YORK, N. Y.

FISH-TRAP.

SPECIFICATION forming part of Letters Patent No. 679,327, dated July 30, 1901.

Application filed April 5, 1901. Serial No. 54,549. (No model.)

*To all whom it may concern:*

Be it known that I, MORRIS S. NEWCORN, a citizen of the United States, residing in the borough of Manhattan, city, county, and State of New York, have invented new and useful Improvements in Fish-Traps, of which the following is a specification.

My invention relates to a trap for use in fishing, crabbing, &c.

The object of my invention is to provide a trap which can be easily lowered into and raised out of the water.

My invention also has for its object to so construct the trap as to permit of its being collapsed or taken down and the several parts folded into a comparatively small space.

I will describe a fish-trap embodying my invention and then point out the novel features thereof in the claims.

In the accompanying drawings, Figure 1 is a perspective view of a fish-trap embodying my invention. Fig. 2 is a side elevation thereof. Fig. 3 is a bottom plan view thereof, showing the trap in its open position. Fig. 4 is a view of the fish-trap, showing it collapsed and folded. Fig. 5 is a detail view of a standard or support involved in my invention.

Similar numerals of reference designate corresponding parts in all of the figures.

The trap is adapted for use in fishing, crabbing, &c. For convenience I will refer to the whole device in the specification and claims as a fish-trap. It will be understood that by the use of this phrase I do not limit myself to a trap solely for fish.

1 represents a bottom section, 2 a top section, and 3 side sections, of which there may be any number, according to the peripheral contour of the top or bottom sections or both. Each of the sections comprises a frame $1^a$ and a wall $1^b$, which fills or closes the space within the frame. The wall is preferably formed with openings in order that water may freely escape from within the casing. The covering is here shown as consisting of wire strands interwoven and secured at their ends to the frame. Instead netting of any description may be employed.

4 represents standards extending between the top and bottom sections. These standards are here shown as being bail-shaped. The horizontal portion $4^a$ of each standard passes beneath the bottom section and they are crossed. The vertical portions $4^b$ of the standards pass through the openings $1^e$ of the top and bottom sections. At the upper ends of the vertical portions the standards are provided with hook portions $4^c$, in which the frame of the top section is supported. The member $4^d$ of each hook acts as a clamp to retain the top in position on the standards.

The side sections 3 are each secured at one of their edges to either the top or bottom section in such manner that their free edges may be swung relatively to the top and bottom sections. All or less than all the sections may be so secured. If less than all, the remaining sections may be stationary. This last relates to the operation of the trap. In the present instance all of the sections are movable relatively to the top and bottom. The form of connection is preferably a hinge connection, and in the present instance rings 5 may be employed. 6 represents cords, a cord being provided for each section by means of which the sections are permitted to move or are moved. All of the cords 6 are joined to a single cord 7 in order that all the sections may be moved simultaneously.

All of the parts comprised in the trap are metal, though other material may be employed. The top and standards are separable from the bottom and sides. The purpose of this is that the trap may be folded to occupy a comparatively small space. The hinged connections between the side sections is such that the sides may be folded on the bottom. The top and standards are then placed on the sides and bottom, as shown in Fig. 4.

In the operation of the trap a bait is fastened to the middle of the bottom section. As the trap is lifted by the cord 7 the side sections are moved to a position at which the trap is closed. In this position the trap is lowered into the water. When the trap reaches bottom, the cord 7 and consequently the cords 6 are slackened, so that the side sections drop to have the trap open. The side sections are so arranged that when they are unrestrained they will fall by gravity, and gravity may be assisted by weighting the free edge or edges of the sides or by so constructing the top and bottom as to have the side sections incline or flare outwardly from the section to which they are hinged. In this instance the top section is larger than the bottom section. When fish, crabs, &c., enter the trap, the side sections are swung or moved on their hinges to close the trap.

If desired, in very deep water the trap may be suspended by one cord and the hinged section or sections operated by a second cord. Also the side sections may be operated by individual cords. This will permit of one, two, three, &c., side sections being operated independently of the other sections.

What I claim as my invention, and desire to secure by Letters Patent, is—

1. In a fish-trap, the combination of a top section, a bottom section and side sections, all of said side sections being movable relatively to the top and bottom sections and adapted when unconfined to move to open the trap, and means for moving the said side sections to close the trap.

2. In a fish-trap, the combination of a top section a bottom section and side sections each of which consists of a frame and crossed wires forming meshes secured to said frame, said top section being supported above the bottom section, and said side sections being connected to said bottom section and means for permitting said side sections to move relatively to the top and bottom sections whereby the trap may be opened or closed.

3. In a fish-trap, the combination of an upper section, a lower section, and supports separable from the top and bottom and adapted to support one above the other and side sections connected to the bottom section and adapted to be swung about the bottom section.

4. In a fish-trap, the combination of a bottom section having openings at its corners, supports having a vertical portion passed through diagonally opposite openings and horizontal portions connecting the vertical portions a top section supported by said vertical portions, and side sections each having an edge connected with an edge of the bottom section, and a cord connected with each side section to cause swinging of said sections relatively to the top and bottom sections.

5. A fish-trap consisting of a bottom section, a top section and four side sections, each of which has a hinge connection with the bottom section.

6. A collapsible fish-trap consisting of a bottom, a top, separable supports intermediate the top and bottom, and side sections hinged to said bottom and adapted to be folded thereupon.

7. In a fish-trap, the combination of a bottom section, a top section, supports intermediate the top and bottom sections, side sections, each having an end hinged to said bottom section and adapted normally to fall away from the top section to have the trap open and means for moving said side sections toward the top section to close the trap.

8. In a fish-trap, the combination of a bottom section, supports extending upwardly from said bottom and having clamps at their upper portions, a top section held by said clamps and side sections suitably connected to said bottom section and means for moving said sections relatively to the top to open and close the trap.

In testimony whereof I have hereunto signed my name to this specification in the presence of two subscribing witnesses.

MORRIS S. NEWCORN.

Witnesses:
HENRY A. PETERSEN,
MOSES WISEMAN.